(12) United States Patent  (10) Patent No.: US 8,412,796 B2
Smyth et al.  (45) Date of Patent: Apr. 2, 2013

(54) REAL TIME INFORMATION FEED PROCESSING

(75) Inventors: Barry Smyth, County Wicklow (IE); Owen Phelan, Dublin (IE); Kevin McCarthy, County Wexford (IE)

(73) Assignee: University College Dublin—National University of Ireland, Dublin, Dublin (IE)

( * ) Notice: Subject to any disclaimer, the term of this patent is extended or adjusted under 35 U.S.C. 154(b) by 215 days.

(21) Appl. No.: 12/846,154

(22) Filed: Jul. 29, 2010

(65) Prior Publication Data

US 2011/0029636 A1  Feb. 3, 2011

Related U.S. Application Data

(60) Provisional application No. 61/213,941, filed on Jul. 31, 2009.

(51) Int. Cl.
    *G06F 15/16*  (2006.01)
(52) U.S. Cl. ........................................... 709/217
(58) Field of Classification Search .................. 709/217
    See application file for complete search history.

(56) References Cited

U.S. PATENT DOCUMENTS

2008/0147450 A1*  6/2008  Mortimore ........................ 705/5
2009/0030899 A1*  1/2009  Tareen et al. ..................... 707/5

OTHER PUBLICATIONS

TalkBinary.com, "Simple Data Structure—The Vector", Jul. 18, 2008, p. 1.*
Wikipedia, "Index", Mar. 21, 2008, p. 1.*

* cited by examiner

*Primary Examiner* — Ryan Jakovac
(74) *Attorney, Agent, or Firm* — Jacobson Holman PLLC

(57) ABSTRACT

A real time information feed system comprises an interface to receive a real time information feed and a data mining engine for retrieving data concerning a subscriber. A recommendation engine automatically modifies the real time information feed according to the mined data; and a subscriber interface outputs the modified real time information for delivery to the subscriber. The data mining engine is adapted to mine data in a real time communication medium used by the subscriber, such as a micro-blogging service. The data mining engine comprises an indexer for mining and indexing the real time information feed and the subscriber data to provide a plurality of indexes; and to generate vectors representing the separate indexes and to compare the vectors to modify. The data mining engine and the recommendation engine combine recommendation and information retrieval settings from a plurality of online and offline sources to produce a single amalgamated list of results to harness a user's usage patterns and social graph activity on a social network or updating service, that further allows the generation of user profiles as part of a media recommendation system.

22 Claims, 11 Drawing Sheets buzzer

@buzz_er | preferences | about | logout recommended articles

How I Would Have Handled The Stolen Phone Story
The biggest story in tech today is the Gizmodo stolen iPhone debacle (note that i use the work "stolen" only to keep the description brief, not in any legal way). An Apple emplyeee with a iPhone prototype left it in a bar. Someone found it and sold it to Gizmodo for $5,000 Gizmodo got a....

♡ ♀ | trash | retweet | read more >>

Facing Heat From Facebook's Like Button, Glue Ramps Up Social Recommendations
Facebook's new Like button was announced last week, which allows users to "like" any piece of content on an outside site with one click. Those likes are then transported back to Facebook and integrated into user's profiles. This feature is expected to create a vast Facebook-centric...

♡ ♀ | trash | retweet | read more >>

GetGlue Aims to Provide Better Moive, Music and Book Recommendations
Social recommendations service GetGlue has been updated with a new interface and features, including personalized new releases and real-time recommendations. GetGlue's browser plugin lets you see what item your friends have like or recommended on parter websites. It also lets you rate topics...

♡ ♀ | trash | retweet | read more >>

Sony To Stop Manufacturing Floppy Discs After 30

--- evaluation details

We've recommended articles based on the feeds you gave us.

So we can gather some data, we have randomized the results to determine the best of several techniques to use.

If you like or dislike an article, click the ♡ or ♀.

If you don't wish to get recommended a certain article again, click "trash".

If you'd like to share the article, click on "retweet" so you can tweet it!

IMPORTANT: If you find articles interesting, please click on them, they open in a new window/tab by default!

*feedback*

REAL TIME INFORMATION FEED PROCESSING

This is a complete application claiming benefit of provisional No. 61/213,941, filed Jul. 31, 2009, hereby incorporated by reference.

FIELD OF THE INVENTION

The invention relates to real time information feeds.

BACKGROUND

The real-time Web is emerging as new technologies enable a growing number of users to share information in multi-dimensional contexts. Sites such as Twitter™ (http://www.twitter.com, Foursquare™ (http://www.foursquare.com), and Qik™ (http://www.quik.com) are platforms for real-time blogging, message-sending, and live video broadcasting to friends and a wider global audience. Companies and individuals can receive instantaneous feedback on products and services from real-time web (RTW) sites such as Blippr™ (http://www.blippr.com). New real-time systems are emerging in the form of research projects and start-up companies, as well as established technology companies adapting to the paradigm.

The prior news recommendation approaches appear to have in common profiling the interests of users by their past and recent news consumption histories. Recommender systems must cope with the very large volume of news stories that are available and the varied tastes and preferences. Also, news is a biased form of media that is increasingly driven by the stories that are capable of selling advertising. Niche stories that may be of interest to a small portion of readers are often not communicated to the relevant users. All of this has contributed to a background of using recommender systems to help users navigate through the large number of available articles that are written and published every day based on learned profiles of users. For example Google News™ (http://news.google.com) is a topically segregated mashup of a number of feeds, with automatic ranking strategies based on user interactions (click-histories and click-throughs). It is an example of a hybrid technique for news recommendation, as it utilizes a user's search keywords from the search engine itself as a support for explicit ratings. Digg™ (http://www.digg.com) is another well-known example that allows users to rate Web pages, a by-product of which is a high overlap of selected topical news items.

An objective of the invention is automatic processing of real time information feeds so that they are more relevant to the recipient.

SUMMARY OF THE INVENTION

According to the invention, there is provided a real time information feed system comprising:
  an interface adapted to receive a real time information feed;
  a data mining engine adapted to retrieve data concerning a subscriber;
  a recommendation engine adapted to automatically modify the real time information feed according to the mined data; and
  a subscriber interface adapted to output the modified real time information for delivery to the subscriber.

In one embodiment, the data mining engine is adapted to mine data in a real time communication medium used by the subscriber.

In one embodiment, the data mining engine is adapted to mine data in a real time communication medium used by the subscriber; and wherein the communication medium is a blogging service.

In one embodiment, the data mining engine is adapted to mine data in a real time communication medium used by the subscriber; and wherein the communication medium is a micro-blogging service.

In one embodiment, the data mining engine comprises a configuration interface for receiving subscriber permissions for access to said data. In one embodiment, the data mining engine comprises an indexer for mining and indexing the real time information feed and the subscriber data. In one embodiment, the data mining engine is adapted to separately index the real time information feed and the subscriber data to provide a plurality of indexes. In one embodiment, the data mining engine is adapted to separately index the real time information feed and the subscriber data to provide a plurality of indexes; and wherein the data mining engine is adapted to generate vectors representing the separate indexes and to compare the vectors to modify.

In one embodiment, the data mining engine and the recommendation engine are adapted to combine recommendation and information retrieval settings from a plurality of online and offline sources to produce a single amalgamated list of results.

In one embodiment, the recommendation engine is adapted to perform an analyzer and filtering technique that harnesses a user's usage patterns and social graph activity on a social network or updating service, and that generates user profiles for media recommendation.

In one embodiment, the data mining engine is adapted to:
  extract and tokenize each of a plurality of words or terms in an information feed,
  apply scores to the words or terms, and
  place tokenized words or terms in vector data structures.

In one embodiment, the data mining engine is adapted to:
  extract and tokenize each of a plurality of words or terms in an information feed,
  apply scores to the words or terms, and
  place tokenized words or terms in vector data structures, and
  wherein each vector data structure represents an entire space of words from an index.

In one embodiment, the data mining engine is adapted to:
  extract and tokenize each of a plurality of words or terms in an information feed,
  apply scores to the words or terms, and
  place tokenized words or terms in vector data structures, and
  wherein each word is assigned a corresponding value of frequency with which it occurs in the index.

In one embodiment, the data mining engine is adapted to:
  extract and tokenize each of a plurality of words or terms in an information feed,
  apply scores to the words or terms, and
  place tokenized words or terms in vector data structures, and
  wherein the data mining engine is adapted to compare each vector data structure with another word for co-occurring, terms, and to rank said terms based on their frequency of co-occurrence, and to store said terms in a separate vector.

In one embodiment, the data mining engine is adapted to:
  extract and tokenize each of a plurality of words or terms in an information feed,
  apply scores to the words or terms, and place tokenized words or terms in vector data structures, and wherein the system is adapted to use the extracted co-occurring terms as search filter queries, to use these queries to search one of the original indexes for content, and to return a set of relevant items that contain each term.

In one embodiment, the data mining engine is adapted to:

extract and tokenize each of a plurality of words or terms in an information feed, apply scores to the words or terms, and place tokenized words or terms in vector data structures, and wherein the system is adapted to use the extracted co-occurring terms as search filter queries, to use these queries to search one of the original indexes for content, and to return a set of relevant items that contain each term, wherein the system is adapted to calculate a score for each gathered item.

In one embodiment, the data mining engine is adapted to:

extract and tokenize each of a plurality of words or terms in an information feed, apply scores to the words or terms, and place tokenized words or terms in vector data structures, and wherein the system is adapted to use the extracted co-occurring terms as search filter queries, to use these queries to search one of the original indexes for content, and to return a set of relevant items that contain each term, wherein the system is adapted to calculate a score for each gathered item wherein the score is calculated by summing the search-score of each item's instance in the result list, as seen in the equation:

$$\text{Score}(A_j) = \sum_{\forall t_i} \text{element}(A_j, t_i)$$

where, for each score gathered for item ($A_j$) based on all the corresponding relevant terms ($t_j$), these are added to a vector and the score for each is summed up, and the output score represents the sum total of all scores.

In one embodiment, a word is given a score based on the result of one or more text scoring algorithms across the entire space of text in the index. In one embodiment, a word is given a score based on the result of one or more text scoring algorithms across the entire space of text in the index, and wherein the recommendation engine is adapted to separately store each information feed once is has been analyzed.

In another embodiment:

the interface is adapted to gather real time information feeds from local or remote sources, the data mining engine is adapted to analyze each feed separately in which a plurality of words or terms are extracted and tokenized and are given a score based on the result of one or more text scoring algorithm across the entire space of text in an index generated by the data mining engine;

the recommendation engine is adapted to extract tokenized words or terms from each index and to place them in vector data structures, in which each vector represents the entire space of words from an index, and each word or term is assigned a corresponding value of frequency of which it occurs in the index;

the recommendation engine is adapted to compare each vector data structure with another word for co-occurring words or terms, and to rank said words or terms based on their frequency of co-occurrence, and to then store in a separate vector a co-occurring terms matrix, and the recommendation engine is adapted to extract co-occurring terms as search filter queries and to use these queries to search one of an original index for content in a subject index and to return a set of relevant items that contain each term, and to calculate a score for each item gathered by summing a search score of each item's instance in the result list, and to rank the result list of items.

In a further embodiment:

the data mining engine is adapted to perform the steps of given a user, u, and a set of articles, R, of a first real time information feed and a set of micro-blogging service messages, T, separately index the feed and the messages to produce at least first and second indexes, and to extract resulting index terms from said indexes as the basis to produce first and second term vectors, $M_R$ and $M_T$, respectively;

the recommendation engine is adapted to identify a set of words or terms, t, that co-occur in $M_T$ and $M_R$; as words or terms that are present in most recent micro-blogging service messages and the most recent real time information feed items and to use each word or term, $t_i$, as a query against the first index to retrieve a set of information feed items A that contain t along with their associated frequency score, wherein each co-occurring term, $t_i$ is associated with a set of items $A_1, \ldots, A_n$, which contain t, and the frequency score for t in each of $A_1, \ldots, A_n$ is used to produce a matrix; and the recommendation engine is adapted to calculate an overall score for each article by computing the sum of the frequency scores across all of the terms associated with that item wherein items which contain many message terms with higher frequency scores are preferred to items which contain fewer message terms with lower frequency scores.

In one embodiment, the recommendation engine is adapted to select the top k articles with the highest scores, and each time the interface gathers an individual feed item from a source, the item is copied into both a user's individual item pool and a community item pool.

In one embodiment, the recommendation engine is adapted to select the top k articles with the highest scores, and each time the interface gathers an individual feed item from a source, the item is copied into both a user's individual item pool and a community item pool; and wherein each information item has a differing relevance score in either pool, and as their frequency score changes based on other content in a local directory, results-lists are generated, and a recency-based list is gathered by collecting most recent information feed items.

In one embodiment, the recommendation engine is adapted to select the top k articles with the highest scores, and each time the interface gathers an individual feed item from a source, the item is copied into both a user's individual item pool and a community item pool; and wherein each information item has a differing relevance score in either pool, and as their frequency score changes based on other content in a local directory, results-lists are generated, and a recency-based list is gathered by collecting most recent information feed items; and wherein the recommendation engine is adapted to take a first item from each strategy, to collect said items into a list, to randomize them, and to insert them into a master result list.

In another aspect, the invention provides a real time information feed processing method implemented by a data processing system comprising an information interface, a data mining engine, a recommendation engine, and a subscriber interface, the method comprising the steps of:

the interface receiving a real time information feed;
the data mining engine retrieving data concerning a subscriber;
the recommendation engine automatically modifying the real time information feed according to the mined data; and
the subscriber interface outputting the modified real time information for delivery to the subscriber.

In one embodiment:
the data mining engine mines data in a real time communication medium blogging service used by the subscriber;
the data mining engine comprises an indexer which mines and indexes the real time information feed and the subscriber data, and separately indexes the real time information feed and the subscriber data to provide a plurality of indexes and compares the vectors to modify,
the data mining engine and the recommendation engine combine recommendation and information retrieval settings from a plurality of online and offline sources to produce a single amalgamated list of results,
the recommendation engine performs an analyzer and filtering technique that harnesses a user's usage patterns and social graph activity on a social network or updating service, and generates user profiles for media recommendation.

In one embodiment:
the data mining engine mines data in a real time communication medium blogging service used by the subscriber;
the data mining engine comprises an indexer which mines and indexes the real time information feed and the subscriber data, and separately indexes the real time information feed and the subscriber data to provide a plurality of indexes and compares the vectors to modify,
the data mining engine and the recommendation engine combine recommendation and information retrieval settings from a plurality of online and offline sources to produce a single amalgamated list of results,
the recommendation engine performs an analyzer and filtering technique that harnesses a user's usage patterns and social graph activity on a social network or updating service, and generates user profiles for media recommendation, and the data mining engine:
  extracts and tokenizes each of a plurality of words or terms in an information feed,
  applies scores to the words or terms, and
  places tokenized words or terms in vector data structures.

In a further embodiment:
each vector data structure represents an entire space of words from an index, each word is assigned a corresponding value of frequency with which it occurs in the index, the data mining engine compares each vector data structure with another word for co-occurring, terms, and ranks said terms based on their frequency of co-occurrence, and stores said terms in a separate vector data structure, and the system uses the extracted co-occurring terms as search filter queries, uses these queries to search one of the original indexes for content, and returns a set of relevant items that contain each term.

In one embodiment, the system calculates a score for each gathered item; wherein the score is calculated by summing the search-score of each item's instance in the result list, as seen in the equation:

$$\text{Score}(A_j) = \sum_{\forall t_i} \text{element}(A_j, t_i)$$

wherein, for each score gathered for item ($A_j$) based on all the corresponding relevant terms ($t_j$), these are added to a vector and the score for each is summed up, and the output score represents the sum total of all scores,
wherein a word is given a score based on the result of one or more text scoring algorithms across the entire space of text in the index,
the recommendation engine separately stores each information feed once is has been analyzed,
the interface gathers real time information feeds from local or remote sources, the data mining engine analyzes each feed separately in which a plurality of words or terms are extracted and tokenized and are given a score based on the result of one or more text scoring algorithm across the entire space of text in an index generated by the data mining engine;
the recommendation engine extracts tokenized words or terms from each index and places them in vector data structures, in which each vector represents the entire space of words from an index, and each word or term is assigned a corresponding value of frequency of which it occurs in the index;
the recommendation engine compares each vector data structure with another word for co-occurring words or terms, and ranks said words or terms based on their frequency of co-occurrence, and to then stores in a separate vector a co-occurring terms matrix, and
the recommendation engine extracts co-occurring terms as search filter queries and uses these queries to search one of an original index for content in a subject index and returns a set of relevant items that contain each term, and calculates a score for each item gathered by summing a search score of each item's instance in the result list, and ranks the result list of items.

In a further aspect, the invention provides a computer program product comprising computer software embodied therein and being adapted to perform the steps of any method defined above when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in the Appendix, in which:—

FIG. 6 is a sample screenshot of an article recommendation interleaved with strategy results list, and FIG. 7 is a sample screenshot showing RSS feed recommendation results;

DESCRIPTION OF THE EMBODIMENTS

The invention brings together independent sources of real-time information. In one embodiment, the system uses micro-blogging type messages such as those produced by Twitter™ to process RSS news feed information.

The system of the invention exploits the fact that the real-time Web, in all of its various forms, is a potentially powerful source of recommendation data. For example, it may be possible to profile users based on their blogging, social network comments, and micro-blogging postings and, if so, it may be possible to use this profile information as a way to rank items, products and services for these users, even in the absence of more traditional forms of preference data or transaction histories. This provides a practical solution to the cold-start problem that has resulted in many prior recommender systems nor providing sufficiently relevant information feeds.

In one embodiment, a system of the invention combines RSS™ news feeds with content on public and social streams from Twitter™, looking for overlaps between stories and tweets as a basis for ranking individual news articles. We describe here a number of different recommendation strategies, each capable of promoting different types of real time information feeds based on different streams of Twitter™ information. We present results from a user trial that was designed to examine the response of users to different types of recommendation strategies. We show, for example, that the different recommendation strategies each add their own value when it comes to their ability to rank news. The results illustrate the benefits of combining multiple strategies during news recommendation so that stories are influenced by a combination of age, personal preferences, and more global trending topics.

Figure 1:
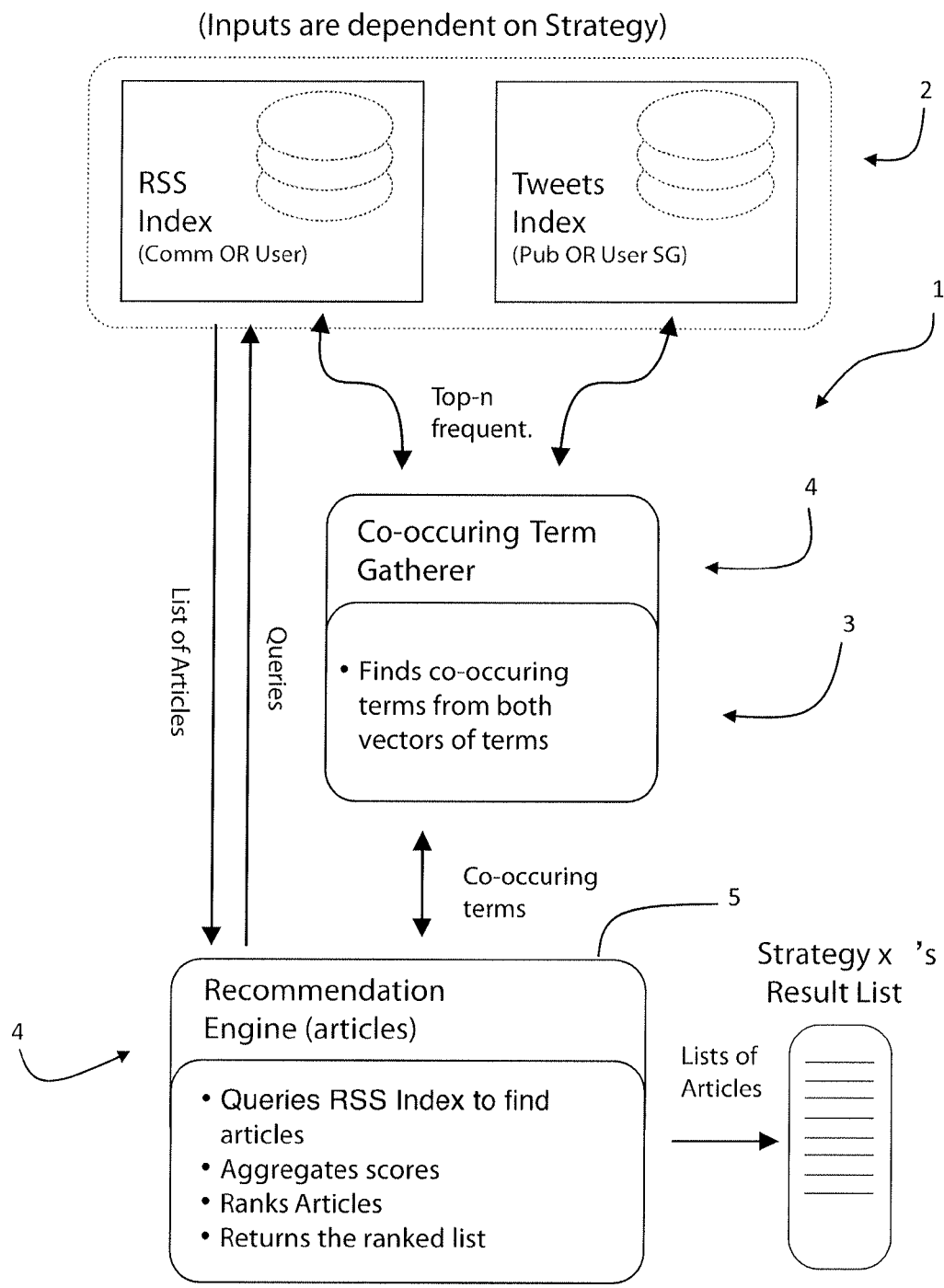
FIG. 1 is a high level diagram illustrating architecture of a real time information processing system of the invention.

Referring to FIG. 1 the system 1 comprises interfaces 2 for receiving information feeds. A core processor comprises one or more digital computing processors (Central Processing Units) operating in one or more servers having hardware characteristics of a network connection to the internet (and in the case of multiple servers, a connection to each other), a set of random access memory, hard disk(s) or solid-state drive(s) for permanent storage for indexes and databases, an operating system with associated software, and a set of applications running persistently carrying out the tasks outlined in the architecture and algorithms in this document.

The core processor 3 has functions implemented by software providing a co-occurring term gatherer 4 and a recommendation engine 5. The software comprises of text parsing and analysis components, network connection components and indexing components, as well as other gathering and analysis components. The component 4 finds co-occurring terms from both real time feeds and feeds them to the component 5. The component 5 then queries the RSS index to locate relevant articles, to aggregate scores, to rank articles, and to return a ranked list.

Figure 2A:
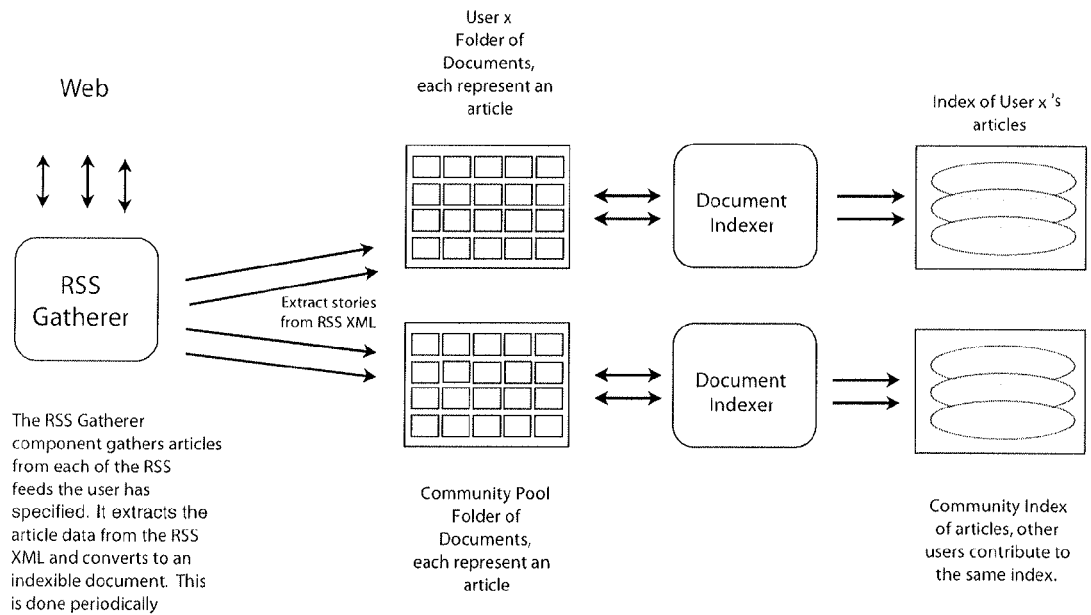
FIG. 2(a) is a flow diagram representation of a process implemented by the system for gathering RSS data and processing it for use.
Figure 2B:
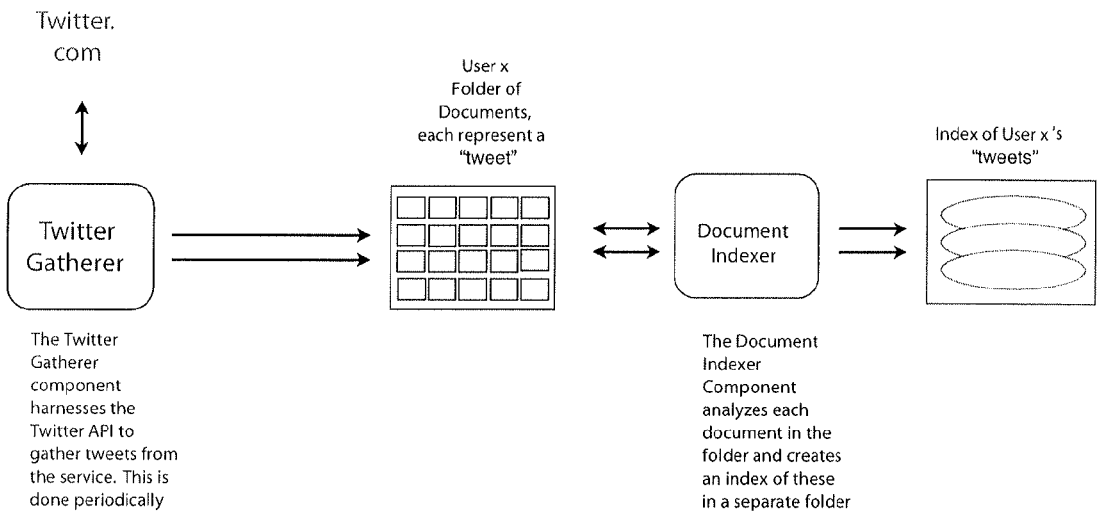
FIG. 2(b) is a flow diagram representation of a process of gathering Twitter™ data and processing it for use.

As shown in FIG. 2(a) the component 4 gathers articles from each of the RSS feeds that the user has specified. Using parsing and text analysis software, it frequently and periodically extracts the article data from RSS XML and converts to an indexible document. It is also possible to allow these analysers to parse on a continual, real-time stream using techniques such as publish-subscribe systems and live socket connections to publishing servers. As shown in FIG. 2(b) the component 4 harnesses the Twitter™ API to gather tweets from the service, also done periodically. An indexer analyses each document in the folder and creates an index of these in a separate folder.

The system 1 adopts a content-based recommendation technique, by mining content terms from RSS™ and Twitter™ feeds as the basis for article ranking.

The system comprises also a front-end component that manages user registration and login processes and allows users to provide their Twitter™ account information and a list of RSS™ feeds that they wish to follow. The system 1 can use the Twitter™ public timeline as an alternative source of tweets, as opposed to tweets only from friends. The interface provides multiple feeds of personalized, community-gathered and trending terms in the system's content-space.

Figure 3A:
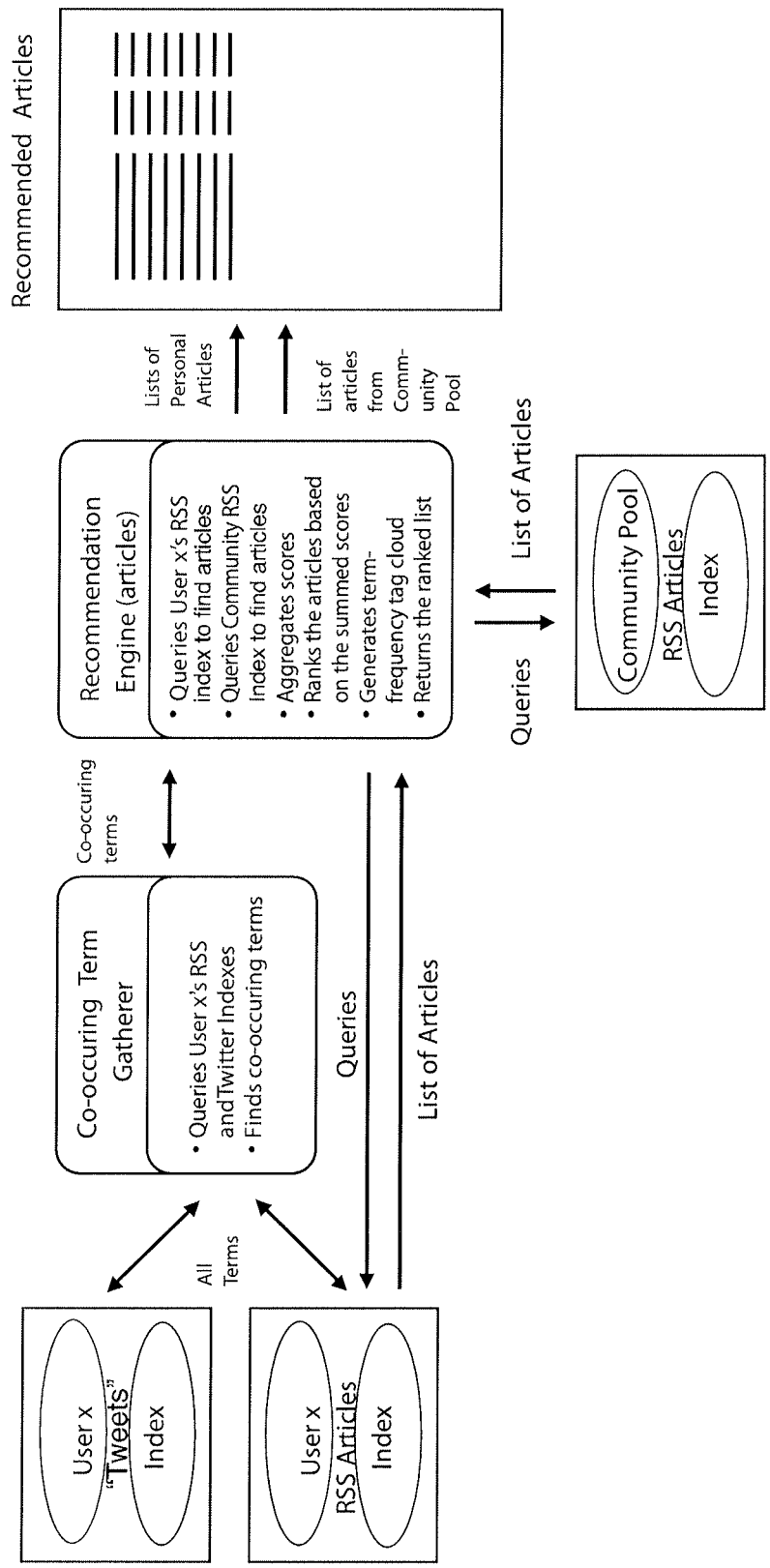
FIGS. 3(a) and 3(b) are lower-level flow diagrams illustrating information processing of the system in greater detail.
Figure 3B:
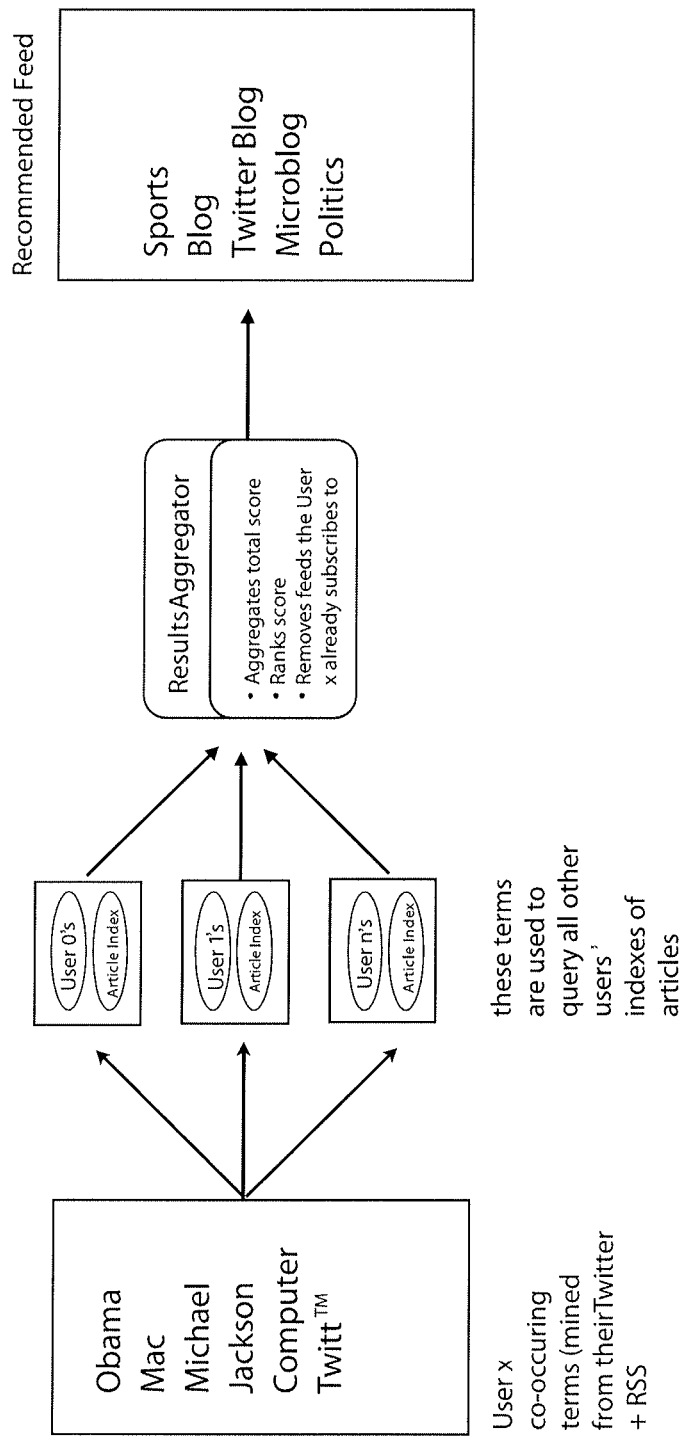

The content gatherer and indexer component 4 is responsible for mining and indexing the real time information feeds, given the user's configuration settings. This component also manages the community pool of articles. The recommendation engine 5 generates a ranked list of RSS™ stories based on the co-occurrence of popular terms within the user's RSS™ and Twitter™ indexes. It has also been extended to compute similarities among users' co-occurring terms, gather recommended feed data, and search a pooled index of the communities' articles to discover new items that the case user may not subscribe to or receive. The recommendation process is illustrated in greater detail in FIG. 3(a) and FIG. 3(b).

---

Algorithm 1
R: rss articles, T: tweets,
$L_T$: lucene tweet index, $L_R$: lucene rss index,
$M_T$: tweet terms map, $M_R$: rss terms map, Q: co-occuring terms map,
$RecListForStrategy_S$: recommendation list for given strategy 1.     define RecommendArticles(R, T, k)
2.         $L_T \leftarrow$ indexTweets(T)
3.         $L_R \leftarrow$ indexFeeds(R)
4.         $M_T \leftarrow$ getTweetTerms($L_T$)
5.         $M_R \leftarrow$ getRSSTerms($L_R$)
6.         Q $\leftarrow$ findCoOccuringTerms($M_R$, $M_T$)
7.         For each $t_i$ in Q Do
8.             A $\leftarrow$ getArticles($t_i$, $A_j$, $L_R$)
9.             For each $A_j$ in A Do
10.                 $S_j \leftarrow S_j +$ TFIDF($t_i$, $A_j$, $L_R$)
11.             End
12.         End
13.         RecList $\leftarrow$ Rank All $A_j$ by Score $S_j$
14.         return top-k(RecList, k)

-continued

Algorithm 1
R: rss articles, T: tweets,
$L_T$: lucene tweet index, $L_R$: lucene rss index,
$M_T$: tweet terms map, $M_R$: rss terms map, Q: co-occuring terms map,
RecListForStrategy$_S$: recommendation list for given strategy 15.    End
16.    End The process by which the system 1 generates a set of ranked RSS™ stories is presented in detail by the Algorithm 1 above together with FIGS. 1 to 5. The system 1 generates four distinct sets of results. The process it does this is the same for all, only inputs varying.

When generating the results for a given strategy, the system takes a specified RSS™ and Twitter™ source and uses the co-occurring technique described below to generate one of the sets of results. This set will be joined with other sets in an interleaving fashion to produce the final list shown to users.

Figure 5:
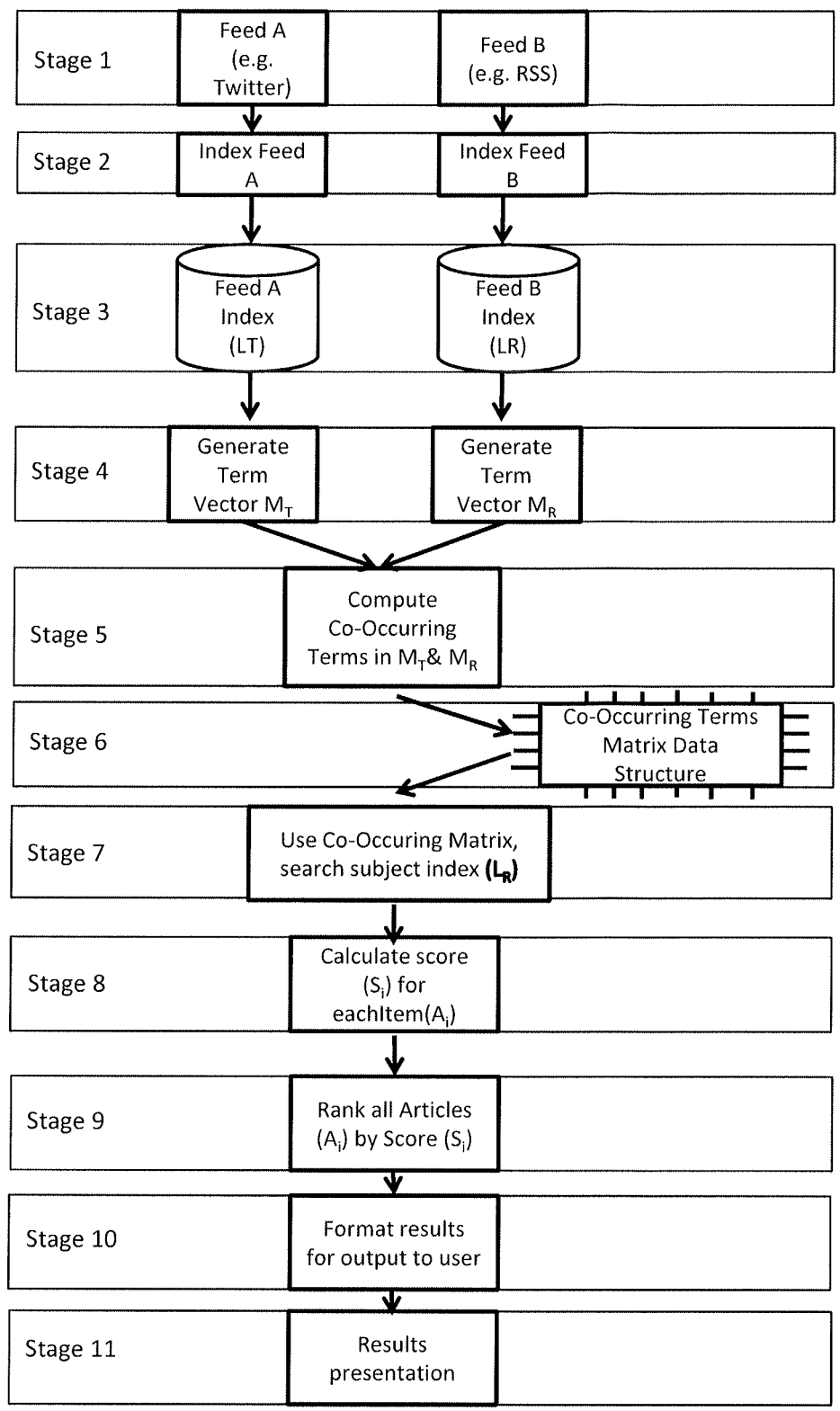
FIG. 5 is a flow diagram illustrating operation of the system in more detail, with reference to matrix processing.
Figure 8:
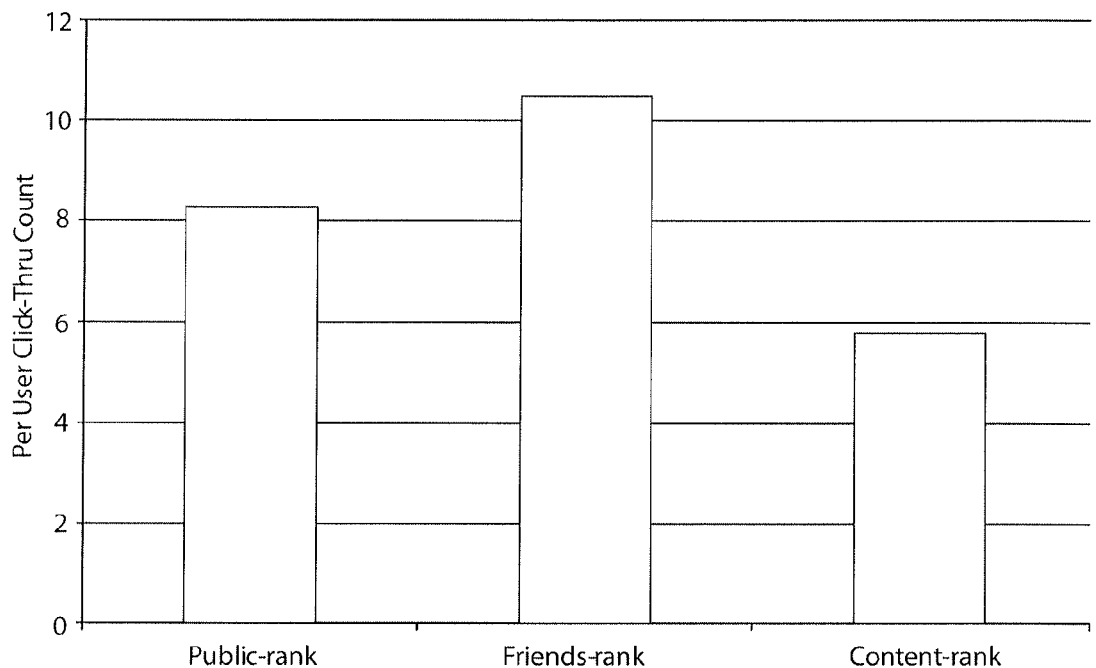
FIGS. 8 and 9 are histograms illustrating subscriber use of information feeds, related to the results of a first user evaluation performed by the system.

In more detail, FIG. 5 illustrates in more detail a process by which the system 1 analyses one or more feeds of information and uses a real-time feed of information as a basis of detecting relevant content and re-ranking the content.

Stage 1: Feed(s) of information are gathered from local and/or remote sources, one or more pertaining to a real-time feed of information.

Stage 2: Each feed is separately analyzed. Each word is extracted, or tokenized. Each word is given a score based on the result of one or more text scoring algorithm across the entire space of text in the index (for example, Term Frequency Inverse Document Frequency).

Stage 3: Once each feed is analyzed as per Stage 2, they are stored separately on disk for analysis and reference.

Stage 4: Tokenized words (or terms) are extracted from each index and placed in vector data structures. Each vector represents the entire space of words from an index. Each word is assigned a corresponding value of frequency of which it occurs in the index.

Stage 5 & 6: Each vector generated in Stage 4 is compared with another word for common, or "co-occurring", terms. These terms are ranked based on their frequency of co-occurrence, and then stored in a separate vector, the co-occurring terms matrix (Stage 6).

Stage 7: The extracted co-occurring terms from Stage 6 are used as search filter queries and the system uses these queries to search one of the original indexes for content (the subject index) and return a set of relevant items that contain each term (for example, articles).

Stage 8: System calculates the score for each item gathered in Stage 7. The score is calculated by summing the search-score of each item's instance in the result list, as seen in Equation 1 below.

Stage 9: The result list of items from Stage 8 is ranked and ordered based on the final score in descending order.

Stage 10: Format the results into a user-understandable format, store for access by the Web interface.

Stage 11: Optionally present the results of the process outlined in Stage 10 in a user interface (for example a Web site).

Given a user, u, and a set of RSS™ articles, R, and a set of Tweets™, T, the system separately indexes both to produce two Lucene™ (http://apache.lucene.org) outputs. The latter is a popular open-source search-engine tool that is suited for fast indexing and document retrieval. The resulting index terms are then extracted from these RSS™ and Twitter™ indexes as the basis to produce RSS and Twitter term vectors, $M_R$ and $M_T$, respectively.

Figures 4A, 4B:
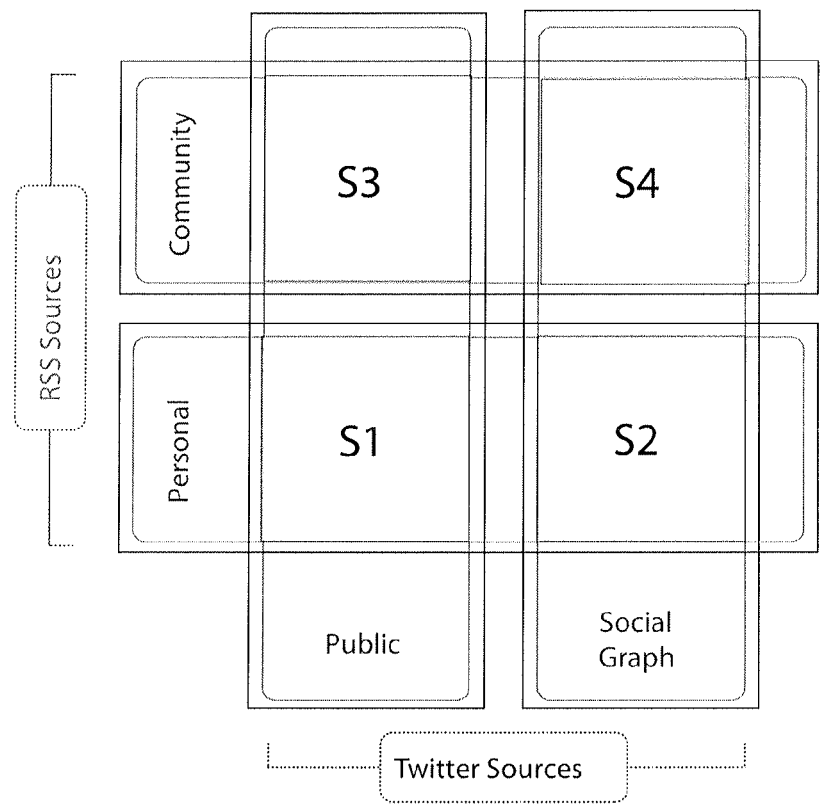
FIGS. 4(a) and 4(b) are diagrams illustrating matrix processing by the system of information sources.

The system 1 then identifies the set of terms, t, that co-occur in $M_T$ and $M_R$; these are the words that are present in the latest tweets and the most recent RSS stories and they provide the basis for the system's recommendation technique. Each term, $t_i$, is used as a query against the RSS™ index to retrieve the set of articles A that contain t along with their associated TF-IDF (term frequency inverse document frequency) score. Thus, each co-occurring term, $t_i$ is associated with a set of articles $A_1, \ldots A_n$, which contain t, and the TF-IDF score for t in each of $A_1, \ldots A_n$ to produce a matrix as shown in FIG. 4(b). To calculate an overall score for each article the system computes the sum of the TF-IDF scores across all of the terms associated with that article as per Equation 1. In this way, articles which contain many tweet terms with higher TF-IDF scores are preferred to articles that contain fewer tweet terms with lower TF-IDF scores.

Finally, producing the recommendation involves selecting the top k articles with the highest scores. Each time the system 1 gathers an individual feed from a source, the articles are copied into both the user's individual article pool, and a community pool. Each article has a differing relevance score in either pool, as their TF-IDF score changes based on the other content in the local directory with it. All four results-lists are generated, and the fifth recency-based list is gathered by collecting the latest to 2-day old articles (as the update windows on each feed can vary). The system takes the first item from each strategy, collects them into a list, randomizes them and puts these into the master result list. It continues this until there are 5 batches of 5 items (25 items in total).

Once the results list is returned to the user, the user is encouraged to click on each item to navigate to the source Web site to read the rest of its contents. The system captures this click-through and also other data such as username, the position in the list, the score and other data, and considers the act of clicking it as a metric for a successful recommendation. It also provides functionality for other ratings and sharing, where users can explicitly provide positive or negative ratings with the use of thumbs up/thumbs down, as well as explicit trashing of items they do not like. The system provides a sharing feature, where users can send items to their Twitter™ stream and share with their friends. The embedded hyperlink redirects via a server so that the data can be captured.

$$\text{Score }(A_j) = \sum_{\forall t_i} \text{element }(A_j, t_i). \quad \text{Equation 1}$$

The above equation (Equation 1) defines how the scoring for a given item ($A_j$) is achieved. For each score gathered for item ($A_j$) based on all the corresponding relevant terms ($t_j$), these are added to a vector and the score for each is summed up. The final score represents the sum total of all scores. This process is visualized in FIG. 4(b).

Each time the system 1 gathers an individual feed from a source, the articles are copied into both the user's individual article pool, and a community pool. Each article has a differing relevance score in either pool, as their TF-IDF score changes based on the other content in the local directory with it.

---
Algorithm 2
Ct: a list of co-occuring terms for a certain User
U: all other users in the system, $u_i$: a user in U,
    $Lu_j$: temporary list of results for the i-th user
L: Aggregated scored list of all feeds from articles in $L_{TOTAL}$
---

1. define BuzzerFeedRecommender(Ct)
2.   Loop (every x minutes or on refresh) Do
3.     For each $u_i$ in U Do
4.       For each $Ct_j$ in C Do
5.         $Lu_i \leftarrow$ getArticles($Ct_j$, $u_i$)
6.           $L_{TOTAL} \leftarrow$ appendTotalResults($Lu_i$)
7.       End
8.     End
9.     L $\leftarrow$ scoreAllResults($L_{TOTAL}$)
10.    RecFeedList $\leftarrow$ TopK$_{(\forall Fj\ in\ L)}$ Score($A_j$)
11.    return RecFeedList
12.   End
13. End

---

The algorithm outlined above (Algorithm 2) describes the method by which the system 1 recommends new RSS feeds to users based on querying each other users' indexes to find new articles. The system queries all of the other users' indexes using the same criteria as when it scans a given user's index for articles. It aggregates the results in a similar fashion, it returns parent RSS™ feed addresses (example: CNN™ Headlines—www.cnn.com/headlines.rss.). These addresses are returned to the user in a list in the user preference's page on the site. Each of these feeds is new, as the user has not selected to follow them before. If we recommend feeds that are already part of the users' list of feeds, we discard them as they provide little use.

EXAMPLE 1

The user logs into the system using their Twitter™ login details (used by the Twitter™ API). The user then configures the system by providing the RSS feeds and selects a recommendation strategy that influences the types of Twitter™ data the system should gather.

These strategies included:

Public-Rank—this strategy uses mined tweets from the public timeline (that is, the most recent public tweets across the entire Twitter™ user base).

Friends-Rank—this strategy mines its tweets only from the user's Twitter™ friends.

Content-Rank—this benchmark strategy does not use Twitter™ but instead ranks articles based on term frequency alone, by scoring articles according to the frequency of occurrence of the top-100 RSS™ terms.

The system collects the latest RSS™ and Twitter™ data and makes a set of recommended feeds for that user. The system gathers the top 100 frequent co-occurring terms between the articles and the tweets that a user index has. This is a basis of inferring relevant and novel descriptive terms of a user, and we can use this to both search article indexes and also to compute user-user similarities.

The screenshot in FIG. 6 is an example of what the user sees. The first column shows the personal articles that have been computed using the user-specified content. The second column shows the recommended articles that are from the community pool of articles that have been gathered based on the co-occurring terms searched across the pool's index. Each of the articles in this column does not appear in the users' feeds; they are new articles that the user would not see in the first column. The articles in these columns have been ranked based on their compound relevance score, as seen in the co-occurrence matrix in FIG. 4. The third column has frequency-ranked co-occurring terms for that user, so the user can clearly see how the recommendation process occurred.

The main personalized content (first column) also has associated tags with each article, which aids the user's understanding as to why the system chose to rank a certain article in a certain way. The results page also includes a standard term/frequency tag cloud that includes terms ordered and sized based on the frequency of each term. This is also useful in explaining to the user the term space that the results were derived from.

The second screenshot (FIG. 7) depicts the user preference page on the system 1 output ("Buzzer"). This page includes preferences such as their chosen personal RSS™ feeds, as well as options for their Twitter™ influences (either the public, or friends feeds, or no Twitter™ influence at all). The page also provides the user with a list of recommended RSS™ feeds. These feeds are most relevant to the user, but are also new in the sense that the user does not already subscribe to them.

EXAMPLE 2

The strategy selection process is removed from the system, and there are five major strategies that encompass public and social graph Twitter™ sources with community and personal RSS™ sources of items. The result list is an interleaved amalgamation of the results lists of the five strategies explained below.

Each system user brings two types of information to the system—(1) their RSS™ feeds; (2) their Twitter™ social graph—and this suggests a number of different ways of combining tweets and RSS™ during recommendation. The current build considers 4 different recommendation strategies (S1-S4), and includes a $5^{th}$ strategy representing a baseline, which is personal articles ranked by most recent (S5), as outlined in FIG. 7. For example, stories/articles can be drawn from a user's personal RSS™ feeds or from the RSS™ feeds of the wider system user community. Moreover, stories can be ranked based on the tweets of the user's own Twitter™ social graph, that is the tweets of their friends and followers, or from the tweets of the public Twitter™ timeline. We consider also a benchmark of items from the users RSS™ feeds and ranked by recency.

This gives five different recommendation strategies as follows:

S1—Public Twitter™ Feed/Personal RSS™ Articles: mine tweets from the public timeline and searches the user's index of RSS items.

S2—Friends Twitter™ Feed/Personal RSS™ Articles: mine tweets from people the user follows and searches the user's index of RSS items.

S3—Public Twitter™ Feed/Community RSS™ Articles: mine tweets from the public timeline and searches the entire space of RSS™ items across all users.

S4—Friends Twitter™ Feed/Community RSS™ Articles: mine tweets from the public timeline and searches the entire space of RSS items across all users.

S5—Personal RSS™ articles ranked by recency.

The resulting amalgamation of these lists are presented in a Web interface. The lists are regenerated regularly on the server, and a sample feed is also periodically emailed to users.

More information on how these feeds are amalgamated is given in the following sections.

First User Evaluation

In a first evaluation, the basic system provided users with an alternative way to access RSS™ stories. They could use the system interface as an RSS™ reader or, alternatively, the system recommendation lists can be published as RSS™ feeds and thus incorporated, as a summary feed, into the user's normal RSS™ reader.

Ultimately we are interested in how well the recommendations produced by the system are received by end-users. To test this we have carried out a preliminary evaluation using a small group of 10 participants. Participants configured the system by providing up to 10 of their favorite RSS feeds along with their Twitter™ account information. The system was configured to provide users with access to 3 different recommendation strategies, namely; Public-rank, Friends-rank and Content-rank (as described earlier).

During the study users were asked to use the system as their RSS reader. To begin with they were asked explore the different types of recommendation strategies at their leisure. As a basic evaluation measure we focused on the click-through frequency for articles across the 3 different recommendation strategies.

The results shown in FIG. 6 represent the average per-user click-throughs for each of the recommendation strategies and there is a clear difference in the behaviour of users when comparing the Twitter™-based strategies to the default content-based technique. For example, we see that, on average, the Twitter™-based strategies resulted in between 8.3 and 10.4 click-throughs per user compared with only 5.8 article click-throughs for the content-based strategy; a relative click-through increase of between 30% and 45% for the Twitter™-based strategies.

Figure 9:
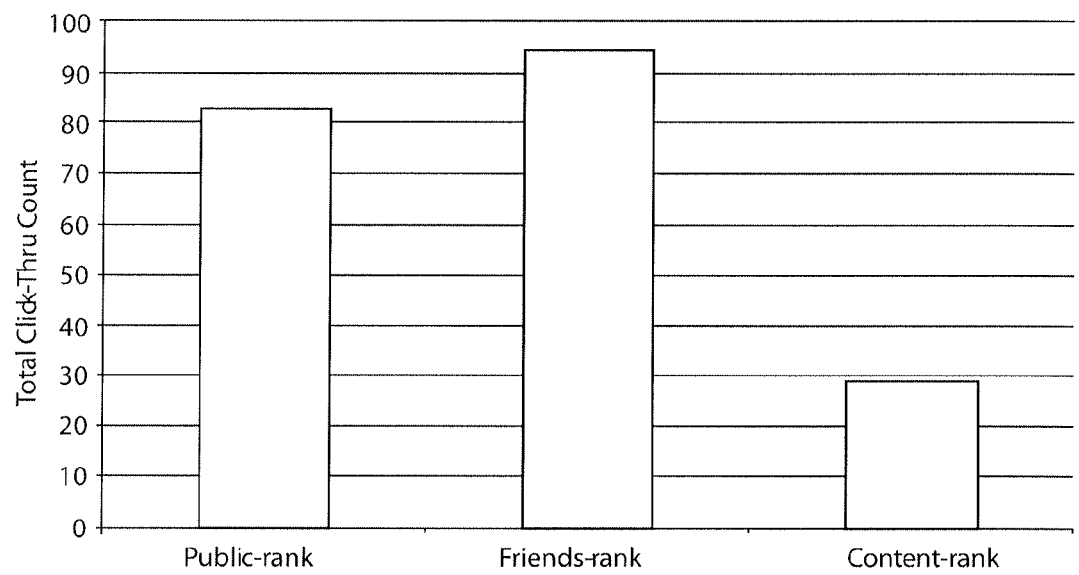
Figure 10:
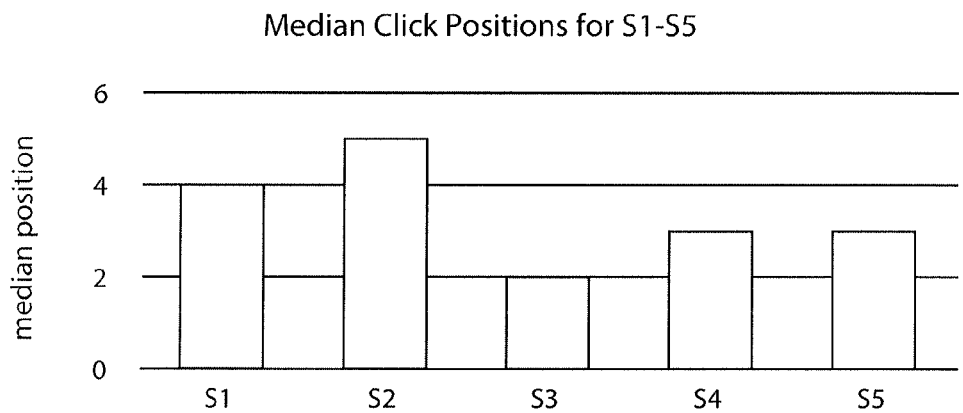
FIGS. 10 and 11 are histograms for subscriber use of information feeds, related to the results of a second user evaluation performed by the system, in which results pertain to median click-positions on the list of results, and number of click-throughs, in both instances per strategy.

We also see that these usage results suggest a preference for the Friends-Rank recommendations compared to the recommendations derived from Twitter™ Public Timeline (Public-Rank). This suggests that users are more likely to tune in to the themes and topics of interest to their friends than those that might be of interest to the Twitter™ public at large. Interestingly, however, this is at odds with the feedback provided by participants as part of a post-trial questionnaire, which indicated a strong preference for the Public-Rank articles as shown in FIG. 9; 67% of users indicated a preference for Public-Rank recommendations compared with 22% of users indicating a preference for Friends-Rank recommendations. Incidentally, none of the participants favored the Content-rank strategy and 11% didn't know which strategy they preferred.

Interestingly, when we compared the ratio of Public-Rank to Friends-Rank click-throughs to the number of friends the user follows on Twitter™ we found a correlation coefficient of −0.89, suggesting that users with more friends tend to be more inclined to benefit from the Friends-Rank recommendations, compared to the recommendations derived from the public timeline.

Although this user study was preliminary, the recommender system was well received and we found that participants preferred the Twitter™-based recommendation strategies. The system feed provided the participants with interesting and topical articles that were viewed in greater detail by clicking-through to the full article text.

It will be appreciated that the system harnesses real-time data as the basis for ranking and recommending articles from a collection of information feeds. The system provides considerable opportunity for further innovation and experimentation as a test-bed for real-time recommendation. The feedback options may be extended to facilitate negative as well as positive feedback. There are also many ways in which the content-based recommendation technique may be improved. For example, moving from single terms to bi-grams or even tri-grams may provide a way to capture more meaningful phrases from information sources to further improve the recommendation ranking. Moreover, the system has the potential to act as a collaborative news service with a number of opportunities to provide additional recommendation services such as recommending new information feeds to users or recommending relevant people to follow.

Second User Evaluation

As part of a second, larger, live user trial, we used a version of the system with a more comprehensive interface providing users with access to a full range of news consumption features. Individual users were able to easily add their favorite RSS feeds (or pick from a list of existing community feeds) and synchronize up their Twitter™ accounts, to provide the system with access to their social graph. In addition, at news reading time users could choose to trash, promote, demote, and even re-tweet specific stories. Moreover, users could opt to consume their news stories from the system Web site and/or sign up to a daily email digest of stories. In this trial we focus on the reaction of users to the daily digest of email stories since it provides us with a consistent and reliably (once-per-day) view of news consumption.

The system was configured to generate news-lists based on a combination of 5 different recommendation strategies: S1-S4, and S5, a default recency-based strategy that simple recommended the most recent stories. Each daily email digest contained 25 stories in 5 blocks of 5 stories each. Each block of 5 stories was made up of a random order of one story from each of S1-S5; this the first block of 5 stories contained the top-place recommendations from S1-S5, in a random order, the second block contained the second-place stories from S1-S5, in a separate random order, and so on. We did this to prevent any positional bias, whereby stories from one strategy might always appear ahead of, or below another strategy.

The trial itself consisted of 35 active users; users who have registered with the system, signed up to the email digest, and interacted with the system on at least two occasions. The results presented relate to usage information gathered during the 31 days of March 2010 and during this timeframe we gathered a total of 56 million public tweets (for use in strategies S1 and S3) and 537,307 tweets from the social graphs of the 35 registered users (for use in strategies S2 and S4). In addition, the 35 users registered a total of 281 unique RSS feeds as story sources and during the trial period these feeds generated a total of 31,137 unique stories/articles. During the trial, the system issued 1,085 emails. The trial users were considered active users of Twitter™, with an average of 145 friends, 196 followers and 1241 tweets sent.

Our primary interest in this trial is to the response profile of participants across the different recommendation strategies. It was not our expectation that any single strategy would win outright, mostly because each strategy focuses on the recommendation of different types of news stories, for different reasons, and for a typical user we expected, by and large, that they would benefit from the combination of these strategies.

Figure 11:
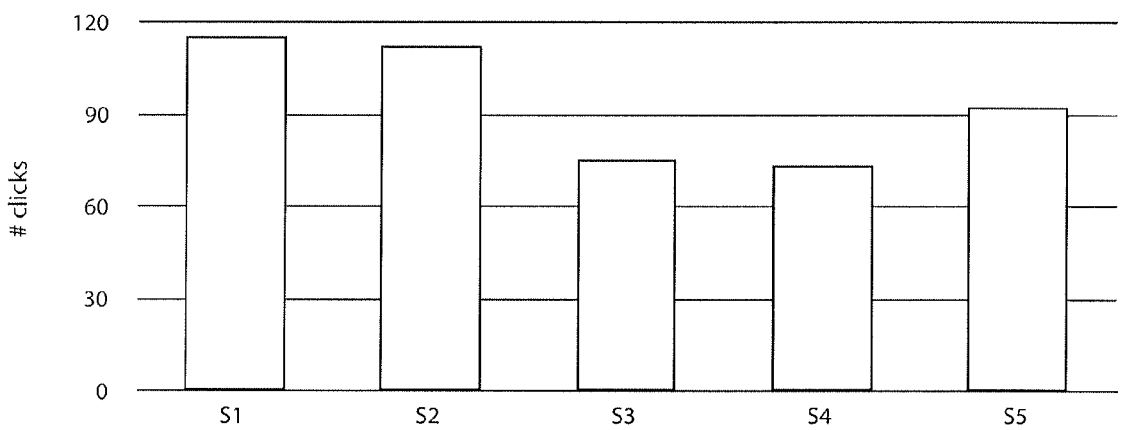

To begin with, FIG. 11 presents the total click-throughs received for stories across the 31 days of email digests, across the participants. It is interesting to note that, as predicted, all of the strategies do receive click-throughs for their recommendations, as expected. Overall, we can see that strategies S1 and S2 tend to outperform the other strategies; for example, S1 and S2 received about 110 click-throughs each, just over 35% more than strategies S3 and S4, and about 20% more than the default recency strategy, S5.

Strategies S1, S2, and S5 recommend stories from the user's own registered RSS feeds, and so there is a clear preference among the users for stories from these sources. However, stories from these feeds that are recommended based on real-time web activity (S1 and S2) attract more click-throughs than when these stories are recommended based on recency (S5). Clearly, users are benefiting from the recommendation of more relevant stories due to S1 and S2. Moreover it is interesting to note that there is little difference between the relevance of stories (as measured by click-through) ranked by the users own social graph (S2) compared to those ranked by the Twitter™ public at large (S1). Of course both of these strategies operate over the user's own RSS feeds to begin with and so there is an assumed relevance in relation to these stories, but clearly there is some value, for the end user, in receiving stories ranked by their friends' activities and by the activities of the wider public.

Participants responded less frequently to stories ranked highly by strategies S3 and S4, although it must be said that these strategies still manage to attract about 30\% of total click-throughs. This is perhaps to be expected. For a start, both of these strategies sourced their recommendations from RSS feeds that were not part of the user's regular RSS™-list; a typical user registered 15 or so RSS feeds as part of their system sign-up and the stories ranked by S3 and S4, for a given user, came from the 250+ other feeds contributed by the participants. By definition then these feeds are likely to be of lesser relevance to a given user (otherwise, presumably, they would have formed part of their RSS submission). Nevertheless, users did regularly respond favorably to recommendations derived from these RSS feeds. Once again we see little difference between the ranking strategies with only fractionally more click-throughs associated with stories ranked by the public tweets than for stories ranked by the tweets of the user's own social graph.

It is also useful to consider the median position of click-throughs in the result-lists across the different strategies. The drawings shows this information for each strategy, calculated across emails when there is at least one click-through for the strategy in question. We see, for example, that the median click-through position for S1 is 4 and S2 is 5, compared to 2 and 3 for S3 and S4, respectively, and compared to 3 for S5. On the face of it strategies S3 and S4 seem to attract click-throughs for items positioned higher in the recommendation lists. However, this could also be explained by the fact that the high click-thru rates for S1, S2, S5 mean that more items are selected per recommendation list, on average, and these additional items will have higher positions by definition.

It is also useful to consider whether particular strategies tended to win out over other strategies on a day-by-day basis. We can judge a strategy $S_i$ to win on day $d_j$ if $S_i$ receives more click-throughs than any other strategy during $d_j$. FIG. 11 shows the result of this analysis across the 31 trial days for each of the five strategies. We can see that strategy S2 (user's personal RSS feeds ranked by the tweets of their social graph) wins out overall, dominating the click-throughs of 10 out of the 31 days. Recency (S5) comes a close second (winning on 8 of the days). Overall strategies S3 and S4 do less well here, collectively winning on only 3 out of the 31 days.

The results of this trial support the idea that each of the 5 recommendation strategies has a useful role to play in helping users to consumer relevant and interesting news stories. Clearly there is an important opportunity to add value to the default recency-based recommendation strategy that is epitomized by S5. The core contribution of this work is to explore whether Twitter can be used as a useful recommendation signal and strategies S1-S4 suggest that this is indeed the case.

Figure 7:
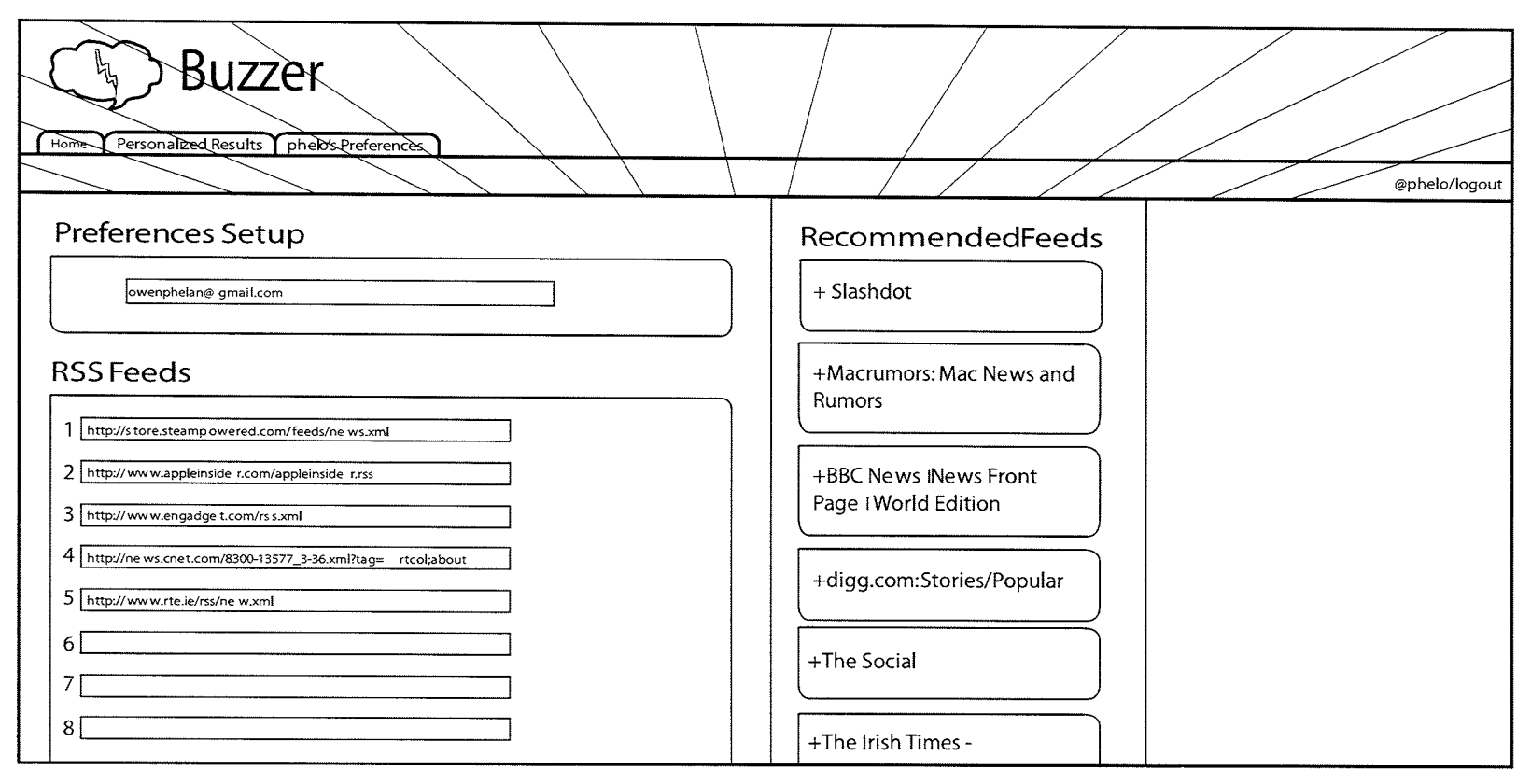
Figure 12:
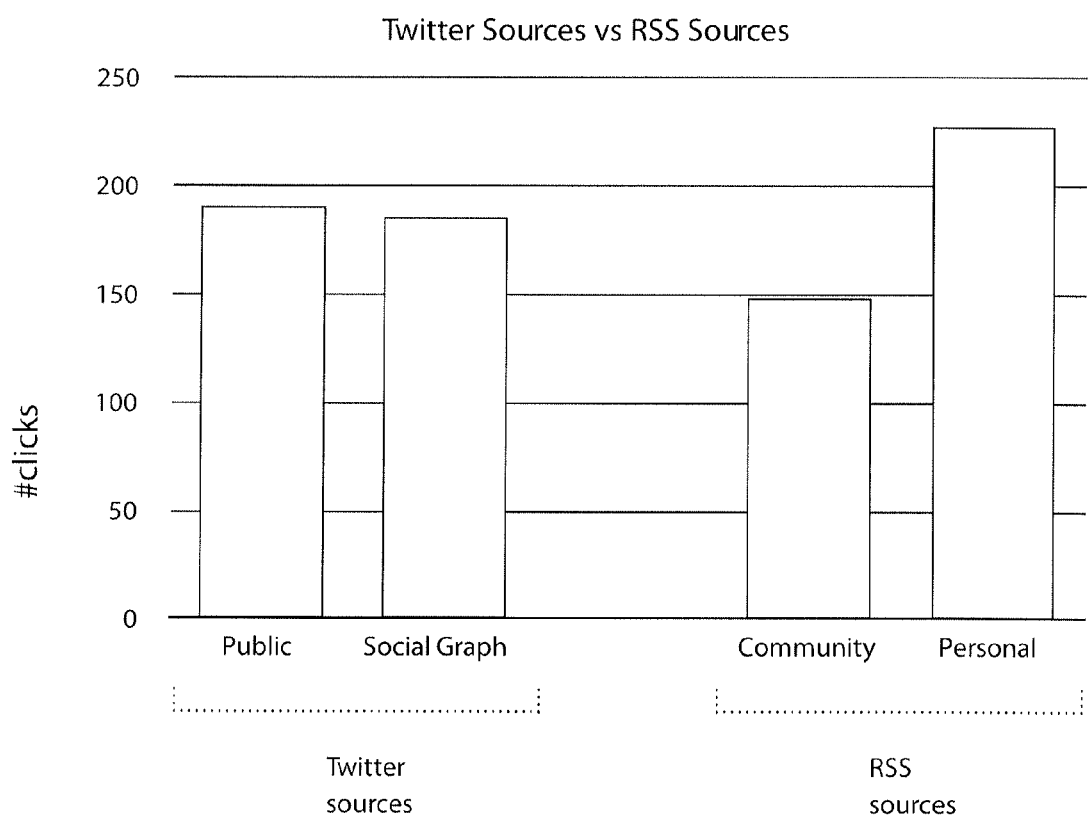
FIG. 12 is a histogram related to the results of a second user evaluation, in which the two major content sources are measured by number of click-throughs of users.

In FIG. 12 we summarize the above click-through data according to the framework presented in FIGS. 6 and 7 by summing the click-through data across the rows and columns of FIG. 6 in order to present an aggregate click-through picture for different classes of recommendation strategies.

For example, one can look at the impact of different sources such as public vs. the user's social graph for ranking stories. Filtering by the Twitter™ public timeline (S1+S3) delivers a similar number of click-throughs (about 185) as when we filter by the user's social graph (S2+S4), and so we can conclude that both approaches to rank have value. Separately, we can see that drawing stories from the larger community of RSS feeds (S3+S4) attracts fewer click-thrus (approximately 150) than stories that are drawn from the user's personal RSS feeds (strategies S1+S2), which attract about 225 click-throughs.

It is envisaged that, rather than using single terms, the system may employ bi-gram and tri-gram analyses, which may provide a way of capturing more meaningful phrases from information sources to further improve the recommendation ranking. Also, we are considering the introduction of a decay function to take into account the considerable item churn that is inherent to a real-time dynamic system. This decay could be based on either an explicit demotion by the user, or an implicit devaluation based on the age of the article.

Moreover, this approach has the potential to act as a collaborative news service with a number of opportunities to provide additional recommendation services. These include recommending friends and potential contacts with services such as Twitter™, and indeed explore further content analysis of individual users' indexes as a different support, as well as new and novel interfaces to convey the news content itself.

Another useful exploration would be recommending friends and potential contacts with services such as Twitter™-based on user-user similarity scores based on the co-occurring terms for each user. This scoring could also act as a weighting mechanism for the article recommendation A system of the invention may employ Human Computer Interaction for interfaces for news production and consumption. One possible contribution to this are context-aware services that treat users within a given geographic domain as a unit in providing news content. Other examples include "Ambient" interfaces that convey important and interesting data in a metaphorical manner.

The system may use the reputation of users on Twitter™ has a bearing on how useful their tweets are during ranking Moreover, there are many opportunities to consider more sophisticated matching and ranking techniques above and beyond the TF-IDF based approach Examples include advanced language analysis techniques such as similarity, sentimental analysis, abstract rating mining from tweets, classification and clustering of text, semantic item-detection analysis, and Hybrid techniques with Collaborative Filtering. Finally, there are other application domains that may also benefit from this approach to recommendation: product reviews and special offers, travel deals, URL recommendations, search engine ranking systems and search engine optimizations, and many other items.

Also, the information sources could be other than Twitter™ and RSS™, for example Google™ Buzz, Facebook™ social updates, Foursquare™ updates, Products in a catalogue from a merchant or shop, and any other similar future products and services.

The potential information sources include blogging, micro-blogging, and social networking services but also Google™ Buzz, Facebook™ social updates, Foursquare™ updates also, as well as applied sensors in a given environment.

The invention is not limited to the embodiments described but may be varied in construction and detail.

The invention claimed is:

1. A real time information feed system comprising a processor that comprises:
an interface adapted to receive a real time information feed;
a data mining engine adapted to retrieve data concerning a subscriber;
a recommendation engine adapted to automatically modify the real time information feed according to the mined data; and
a subscriber interface adapted to output the modified real time information for delivery to the subscriber,
wherein the data mining engine is adapted to perform the steps of given a user, u, and a set of articles, R, of a first real time information feed and a set of micro-blogging service messages, T, separately index the feed and the messages to produce at least first and second indexes, and to extract resulting index terms from said indexes as the basis to produce first and second term vectors, $M_R$ and $M_T$, respectively;
the recommendation engine is adapted to identify a set of terms or words, t, that co-occur in $M_T$ and $M_R$; as words or terms that are present in most recent micro-blogging service messages and the most recent real time information feed items and to use each word or term, $t_i$ as a query against the first index to retrieve a set of information feed items A that contain t along with their associated frequency score, wherein each co-occurring term or word, $t_i$ is associated with a set of items $A_1, \ldots A_n$, which contain t, and the frequency score for t in each of $A_1, \ldots A_n$ is used to produce a matrix; and
the recommendation engine is adapted to calculate an overall score for each article by computing the sum of the frequency scores across all of the terms associated with that item wherein items which contain many message terms with higher frequency scores are preferred to items which contain fewer message terms with lower frequency scores; and
wherein the recommendation engine is adapted to select the top k articles with the highest scores, and each time the interface gathers an individual feed item from a source, the item is copied into both a user's individual item pool and a community item pool; and wherein each information item has a differing relevance score in either pool, and as their frequency score changes based on other content in a local directory, results-lists are generated, and a recency-based list is gathered by collecting most recent information feed items.

2. The real time information feed system as claimed in claim 1, wherein the data mining engine comprises a configuration interface for receiving subscriber permissions for access to said data.

3. The real time information feed system as claimed in claim 1, wherein the data mining engine and the recommendation engine are adapted to combine recommendation and information retrieval settings from a plurality of online and offline sources and are adapted to produce a single amalgamated list of results based on said combination.

4. The real-time information feed system as claimed in claim 1, wherein the recommendation engine is adapted to perform an analyzer and filtering technique that harnesses a user's usage patterns and social graph activity on a social network or updating service, and the recommendation engine is adapted to generate user profiles for media recommendation based on said technique.

5. The real time information feed system as claimed in claim 1, wherein the data mining engine is adapted to:
extract and tokenize each of a plurality of words or terms in an information feed, apply scores to the words or terms, and
place tokenized words or terms in data structures of said vectors.

6. The real time information feed system as claimed in claim 1, wherein the data mining engine is adapted to:
extract and tokenize each of a plurality of words or terms in an information feed, apply scores to the words or terms, and
place tokenized words or terms in data structures of said vectors, and
wherein each vector data structure represents an entire space of words from an index.

7. The real time information feed system as claimed in claim 1, wherein the data mining engine is adapted to:
extract and tokenize each of a plurality of words or terms in an information feed, apply scores to the words or terms, and
place tokenized words or terms in data structures of said vectors, and
wherein each word is assigned a corresponding value of frequency with which it occurs in the index.

8. The real time information feed system as claimed in claim 1, wherein the data mining engine is adapted to:
extract and tokenize each of a plurality of words or terms in an information feed, apply scores to the words or terms, and
place tokenized words or terms in data structures of said vectors, and
wherein the data mining engine is adapted to compare each vector data structure with another word for co-occurring, terms, and to rank said terms based on their frequency of co-occurrence, and to store said terms in a separate vector.

9. The real time information feed system as claimed in claim 1, wherein the data mining engine is adapted to:
extract and tokenize each of a plurality of words or terms in an information feed, apply scores to the words or terms, and
place tokenized words or terms in data structures of said vectors, and
wherein the system is adapted to use the extracted co-occurring terms as search filter queries, to use these queries to search one of the original indexes for content, and to return a set of relevant items that contain each term.

10. The real time information feed system as claimed in claim 1, wherein the data mining engine is adapted to:
extract and tokenize each of a plurality of words or terms in an information feed, apply scores to the words or terms, and
place tokenized words or terms in data structures of said vectors, and
wherein the system is adapted to use the extracted co-occurring terms as search filter queries, to use these queries to search one of the original indexes for content, and to return a set of relevant items that contain each term,
wherein the system is adapted to calculate a score for each of said items.

11. The real time information feed system as claimed in claim 1, wherein the data mining engine is adapted to:
extract and tokenize each of a plurality of words or terms in an information feed, apply scores to the words or terms, and place tokenized words or terms in data structures of said vectors, and wherein the system is adapted to use extracted co-occurring terms or words as search filter queries, to use these queries to search one of the indexes for content, and to return a result list including a set of relevant items that contain each term, wherein the system is adapted to calculate a score for each of said items;

wherein the score is calculated by summing the search-score of each item's instance in the result list, as seen in the equation:

$$\text{Score}(A_j) = \sum_{\forall t_i} \text{element}(A_j, t_i)$$

where, $A_j$ represents items of said result list, and $t_i$ represents terms, and for each score gathered for item $(A_j)$ based on all the corresponding relevant terms $(t_i)$, these are added to a vector and the score for each is summed up, and the output score represents the sum total of all scores.

12. The real time information feed system as claimed in claim 1, wherein a word is given a score based on the result of one or more text scoring algorithms across the entire space of text in the index.

13. The real time information feed system as claimed in claim 1, wherein a word is given a score based on the result of one or more text scoring algorithms across the entire space of text in the index, and wherein the recommendation engine is adapted to separately store each information feed once is has been analyzed.

14. The real time information feed system as claimed in claim 1, wherein:

the interface is adapted to gather real time information feeds from local or remote sources, the data mining engine is adapted to analyze each feed separately in which a plurality of words or terms are extracted and tokenized and are given a score based on the result of one or more text scoring algorithm across the entire space of text in an index generated by the data mining engine;

the recommendation engine is adapted to extract tokenized words or terms from each index and to place them in data structures of said vectors, in which each vector represents the entire space of words from an index, and each word or term is assigned a corresponding value of frequency of which it occurs in the index;

the recommendation engine is adapted to compare each vector data structure with another word for co-occurring words or terms, and to rank said words or terms based on their frequency of co-occurrence, and to then store in a separate vector a co-occurring terms matrix, and the recommendation engine is adapted to extract co-occurring terms as search filter queries and to use these queries to search one of an original index for content in a subject index and to return as a result list a set of relevant items that contain each term, and to calculate a score for each item gathered by summing a search score of each item's instance in the result list, and to rank the result list of items.

15. The real time information feed system as claimed in claim 1, wherein the recommendation engine is adapted to select the top k articles with the highest scores, and each time the interface gathers an individual feed item from a source, the item is copied into both a user's individual item pool and a community item pool.

16. A real time information feed processing method implemented by a data processing system comprising an information interface, a data mining engine, a recommendation engine, and a subscriber interface, the method comprising the steps of:

the interface receiving a real time information feed;

the data mining engine retrieving data concerning a subscriber;

the recommendation engine automatically modifying the real time information feed according to the mined data; and the subscriber interface outputting the modified real time information for delivery to the subscriber wherein the data mining engine performs the steps of given a user, u, and a set of articles, R, of a first real time information feed and a set of micro-blogging service messages, T, separately indexing the feed and the messages to produce at least first and second indexes, and extracting resulting index terms from said indexes as the basis to produce first and second term vectors, $M_R$ and $M_T$, respectively;

the recommendation engine identifies a set of words or terms, t, that co-occur in $M_T$ and $M_R$; as words or terms that are present in most recent micro-blogging service messages and the most recent real time information feed items and uses each word or term, $t_i$ as a query against the first index to retrieve a set of information feed items A that contain t along with their associated frequency score, wherein each co-occurring term, $t_i$ is associated with a set of items $A_1, \ldots A_n$, which contain t, and the frequency score for t in each of $A_1, \ldots A_n$ is used to produce a matrix; and the recommendation engine calculates an overall score for each article by computing the sum of the frequency scores across all of the terms associated with that item wherein items which contain many message terms with higher frequency scores are preferred to items which contain fewer message terms with lower frequency scores; and wherein the recommendation engine selects the top k articles with the highest scores, and each time the interface gathers an individual feed item from a source, the item is copied into both a user's individual item pool and a community item pool; and wherein each information item has a differing relevance score in either pool, and as their frequency score changes based on other content in a local directory, results-lists are generated, and a recency-based list is gathered by collecting most recent information feed items.

17. The real time information feed processing method as claimed in claim 16, wherein:

the data mining engine mines data in a real time communication medium blogging service used by the subscriber;

the data mining engine comprises an indexer which mines and indexes the real time information feed and the subscriber data, and separately indexes the real time information feed and the subscriber data to provide a plurality of indexes and compares the vectors to modify, the data mining engine and the recommendation engine combine recommendation and information retrieval settings from a plurality of online and offline sources to produce a single amalgamated list of results, the recommendation engine performs an analyzer and filtering technique that harnesses a user's usage patterns and social graph activity on a social network or updating service, and generates user profiles for media recommendation.

18. The real time information feed processing method as claimed in claim 16, wherein:

the data mining engine mines data in a real time communication medium blogging service used by the subscriber;

the data mining engine comprises an indexer which mines and indexes the real time information feed and the subscriber data, and separately indexes the real time information feed and the subscriber data to provide a plurality of indexes and compares the vectors to modify, the data mining engine and the recommendation engine combine recommendation and information retrieval settings from a plurality of online and offline sources to produce a single amalgamated list of results, the recommendation engine performs an analyzer and filtering technique that harnesses a user's usage patterns and social graph activity on a social network or updating service, and generates user profiles for media recommendation, and the data mining engine:

extracts and tokenizes each of a plurality of words or terms in an information feed, applies scores to the words or terms, and places tokenized words or terms in vector data structures.

19. The real time information feed processing method as claimed in claim 18, wherein:

each vector data structure represents an entire space of words from an index, each word is assigned a corresponding value of frequency with which it occurs in the index, the data mining engine compares each vector data structure with another word for co-occurring, terms, and ranks said terms based on their frequency of co-occurrence, and stores said terms in a separate vector data structure, and the system uses the extracted co-occurring terms as search filter queries, uses these queries to search one of the original indexes for content, and returns a set of relevant items that contain each term.

20. The real time information feed processing method as claimed in claim 19, wherein the system calculates a score for each gathered item;

wherein the score is calculated by summing the searchscore of each item's instance in the result list, as seen in the equation:

$$\text{Score}(A_j) = \sum_{\forall t_i} \text{element}(A_j, t_i)$$

wherein, $A_j$ represents items of said result list, and $t_i$ represents terms, and for each score gathered for item ($A_j$) based on all the corresponding relevant terms ($t_j$), these are added to a vector and the score for each is summed up, and the output score represents the sum total of all scores, wherein a word is given a score based on the result of one or more text scoring algorithms across the entire space of text in the index, the recommendation engine separately stores each information feed once is has been analyzed, the interface gathers real time information feeds from local or remote sources, the data mining engine analyzes each feed separately in which a plurality of words or terms are extracted and tokenized and are given a score based on the result of one or more text scoring algorithm across the entire space of text in an index generated by the data mining engine;

the recommendation engine extracts tokenized words or terms from each index and places them in vector data structures, in which each vector represents the entire space of words from an index, and each word or term is assigned a corresponding value of frequency of which it occurs in the index;

the recommendation engine compares each vector data structure with another word for co-occurring words or terms, and ranks said words or terms based on their frequency of co-occurrence, and to then stores in a separate vector a co-occurring terms matrix, and the recommendation engine extracts co-occurring terms as search filter queries and uses these queries to search one of an original index for content in a subject index and returns a set of relevant items that contain each term, and calculates a score for each item gathered by summing a search score of each item's instance in the result list, and ranks the result list of items.

21. A non-transitory computer readable medium comprising computer software embodied therein and being adapted to perform the following method steps when executing on a digital processor:

receiving a real time information feed;

retrieving data concerning a subscriber;

automatically modifying the real time information feed according to the mined data; and outputting the modified real time information for delivery to the subscriber wherein the data mining engine is adapted to perform the steps of given a user, u, and a set of articles, R, of a first real time information feed and a set of micro-blogging service messages, T, separately index the feed and the messages to produce at least first and second indexes, and to extract resulting index terms from said indexes as the basis to produce first and second term vectors, $M_R$ and $M_T$, respectively;

the recommendation engine is adapted to identify a set of words or terms, t, that co-occur in $M_T$ and $M_R$; as words or terms that are present in most recent micro-blogging service messages and the most recent real time information feed items and to use each word or term, $t_i$ as a query against the first index to retrieve a set of information feed items A that contain t along with their associated frequency score, wherein each co-occurring term, $t_i$ is associated with a set of items $A_1, \ldots A_n$, which contain t, and the frequency score for t in each of $A_1, \ldots A_1$ is used to produce a matrix; and the recommendation engine is adapted to calculate an overall score for each article by computing the sum of the frequency scores across all of the terms associated with that item wherein items which contain many message terms with higher frequency scores are preferred to items which contain fewer message terms with lower frequency scores; and wherein the recommendation engine is adapted to select the top k articles with the highest scores, and each time the interface gathers an individual feed item from a source, the item is copied into both a user's individual item pool and a community item pool; and wherein each information item has a differing relevance score in either pool, and as their frequency score changes based on other content in a local directory, results-lists are generated, and a recency-based list is gathered by collecting most recent information feed items.

22. A real time information feed system comprising a processor that comprises:

an interface adapted to receive a real time information feed;

a data mining engine adapted to retrieve data concerning a subscriber;

a recommendation engine adapted to automatically modify the real time information feed according to the mined data; and a subscriber interface adapted to output the modified real time information for delivery to the subscriber wherein the data mining engine is adapted to perform the steps of given a user, u, and a set of articles, R, of a first real time information feed and a set of micro-blogging service messages, T, separately index the feed and the messages to produce at least first and second indexes, and to extract resulting index terms from said indexes as the basis to produce first and second term vectors, $M_R$ and $M_T$, respectively;

the recommendation engine is adapted to identify a set of words or terms, t, that co-occur in $M_T$ and $M_R$; as words or terms that are present in most recent micro-blogging service messages and the most recent real time information feed items and to use each word or term, $t_i$, as a query against the first index to retrieve a set of information feed items A that contain t along with their associated frequency score, wherein each co-occurring term, $t_i$ is associated with a set of items $A_1, \ldots A_n$, which contain t, and the frequency score for t in each of $A_1, \ldots A_n$ is used to produce a matrix; and wherein the recommendation engine is adapted to select the top k articles with the highest scores, and each time the interface gathers an individual feed item from a source, the item is copied into both a user's individual item pool and a community item pool; and wherein each information item has a differing relevance score in either pool, and as their frequency score changes based on other content in a local directory, results-lists are generated, and a recency-based list is gathered by collecting most recent information feed items; and wherein the recommendation engine is adapted to take a first item from each pool, to collect said items into a list, to randomize them, and to insert them into a master result list.

* * * * *